June 30, 1953 C. W. LYTLE 2,644,141

TUNER FOR RADIO RECEIVERS AND THE LIKE

Filed Nov. 24, 1950 3 Sheets-Sheet 1

Inventor:
Chester W. Lytle,
by [signature] Atty.

TUNER FOR RADIO RECEIVERS AND THE LIKE

Filed Nov. 24, 1950

3 Sheets-Sheet 2

Inventor:
Chester W. Lytle,
by Thos. Q. Kavanagh
Att'y

June 30, 1953 C. W. LYTLE 2,644,141

TUNER FOR RADIO RECEIVERS AND THE LIKE

Filed Nov. 24, 1950 3 Sheets-Sheet 3

Inventor:
Chester W. Lytle,
by [signature] Atty.

Patented June 30, 1953 2,644,141

UNITED STATES PATENT OFFICE 2,644,141

TUNER FOR RADIO RECEIVERS AND THE LIKE

Chester W. Lytle, Chicago, Ill., assignor, by mesne assignments, to Lytle Engineering & Mfg. Co., a corporation of Illinois Application November 24, 1950, Serial No. 197,383

3 Claims. (Cl. 336—79)

This invention relates to improvements in tuners for radio receivers, and the like, and also to improvements in variable impedance elements therefor. The invention relates to improved forms of impedance elements, generally inductances, and also to the combining of such elements into the tuner as a complete tuning unit. Specifically, the invention relates to such devices as the foregoing which are intended especially for use in the tuning of high frequencies, such as the frequencies at present used in F. M. reception, and also in the so-called low band and high band frequencies of television transmission and reception. However, it will appear that I am not limited to the foregoing or any other frequencies, since the devices herein disclosed are useful over many ranges of frequencies, both higher and lower than those mentioned.

One principal object of the invention is to provide an impedance element for use in such devices, which impedance element shall be of small size, accurate, and of substantially constant impedance qualities over extended intervals of time, and under widely varying atmospheric conditions and temperature variations, and otherwise well adapted for use in such devices as tuners for radio reception. In this connection it is a further object to provide a construction and design of such device which may be commercially produced in large numbers and quantities, at low cost, and with close manufacturing tolerances, and from materials which are very stable electrostatically and otherwise well adapted for such uses.

It is a further object of the invention to provide a form of variable impedance element which may be used as either an inductance element or a capacitance element, although generally it will be used as an inductance element as presently will appear herein. In this connection present tendencies and trends are in the direction of tuning by variable inductances of the electrostatic type, wherein use is made of a stator element and one or two corresponding rotor elements which are movable adjacent to the two faces of such stator element. These rotor elements are located close to, but not in contact with, the stator element, and by movement of the rotor elements so that as the areas of overlap between them and the stator element change it is possible to vary the impedance of such stator element in well understood manner and according to well understood principles.

When the impedance is an inductor or inductance it is generally formed of loop form with its two terminals forming the ends of such loop; and correspondingly the rotor element is so located and moved that a greater or smaller portion of such loop of the stator is blanked out by the electrostatic effect of the proximate rotor elements. Heretofore it has also been the practice to form such loop of the stator element as a U-shaped section of conductor, generally thin sheet metal, cut to proper shape and suitably supported by one or more insulating sheet supports. With this construction the impedance of the unit is necessarily limited to that of only a portion of a single loop. Accordingly, when it becomes necessary to provide variable impedance of greater value than that possible from such a single loop, it has heretofore been necesary to use two or more such elements in series connection, each being provided with its cooperating rotor elements. This limitation has thus imposed structural complications in the design of the tuner, since it has been necessary to provide the series interconnections between the terminals of the proper impedance elements; and furthermore, the use of numerous such elements strung along the length of the tuner has correspondingly increased the length of the tuner itself. All of these objections have also militated against production of tuners of high accuracy and sharpness of tuning, since the use of numerous elements so connected together in series, generally creates conditions under which cross-coupling will occur between adjacent impedance elements which are simultaneously connected into the circuits.

It is a prime object of the invention to provide impedance elements of the electrostatic type which are of such design and construction that greatly increased impedance values may be produced by such elements, and at the same time to hold the physical sizes of such elements to very small amounts so that high frequencies may be accurately tuned, and so that the overall sizes of the tuners as a whole may be held to low values. In this connection it is well understood that when tuning high frequencies it is necessary to hold the connections between various elements to small sizes since these connections in themselves introduce impedance values into the circuit, which values are of uncertain and non-uniform amounts. In connection with the foregoing it is a further object of the invention to so design and construct the variable impedance element that more than a single turn or loop may be provided in each element, as for example, two or even a number of turns. Since the variation of impedance is secured by movement of the rotor element or elements within planes lying adjacent and parallel to the stator element's conductor or conductors, it is necessary that the design be such that all portions of the conductor loop or loops of the stator element shall be properly influenced by such rotor movements. This condition imposes the further condition that all portions of the stator conductor or conductors shall lie within planes which are parallel or substantially parallel to the planes within which the rotor movements occur, and the further condition that all portions of such conductor loop or loops shall be exposed to the electrostatic influences of the adjacent rotor elements. This in turn requires that the design shall be such that interfering elements or planes shall not be imposed between the loops of the impedance element and the tuning rotor, which elements or planes would interfere with proper electrostatic influence of the rotor element on the stator element's turns.

In the co-pending application of Nienaber, Henderson, Ranseen and Lytle for patent on improvements in Radio Signal Reception, and Tuning, Serial No. 110,722, filed August 17, 1949, now Patent 2,558,454, granted June 26, 1951, there are disclosed improvements in tuners, which tuners include variable impedances of the electrostatic type, and are of inductance effects. Furthermore, in that application provision has been made for tuning through low and high band television, and also through F. M. range by use of a single tuner. That tuner disclosure also includes several variable impedance elements, some of which are of greater possible impedance values than others, according to the requirements of the several circuits in which such impedances are contained during tuning. In the case of the variable impedances of higher values as shown in that application it is necessary to secure the impedance effects of several turns in series connection, and for that purpose it is necessary, when using the single turn form of electrostatic variable impedance, to use several of such impedance elements in series connection and with corresponding circuit connections between such elements. These facts have made it necessary to increase the overall size of such tuner according to the requirements of such numerous impedance elements, and specifically have increased the axial length of the tuner. Due to the need of using interconnections between the several impedance elements as disclosed in that tuner application it has also been found desirable or even necessary to make special provision in such interconnections for avoiding or reducing cross-coupling when two or more of such impedance elements are simultaneously in circuit connection.

It is a prime object of the present invention to provide variable impedance elements of the electrostatic type in which much higher impedance values may be secured, by provision of more than a single loop or turn in each such variable impedance element, and without increase of the axial length of the element over the axial length of a similar single loop or turn element. By these improvements it will be possible to provide the needed impedance values in all of the variable impedance elements within an axial length not greater than that required for a corresponding number of variable impedance elements of the single loop turn type as heretofore known and built. By these improvements, also, it will be possible to completely eliminate the numerous interconnections between impedance elements of the single loop type as heretofore required, in the cases of high value impedance elements needed in the circuits. Various other benefits and advantages will also follow from the use of variable impedance of the forms herein disclosed, in tuners of the type disclosed in that earlier application, as well as in many other locations and uses. Some of these will appear more in detail hereinafter.

In that earlier application there is also disclosed a form and construction of tuner in which provision is made for tuning successively through several ranges or bands of frequenices, specifically there is provision for tuning through both the low and high bands of television, and the F. M. range. Provision is also made in that case for effecting these tuning functions by continuous rotary movements of the rotor elements of the variable impedance electrostatic type elements, with suitable switching means operable during intervals of passing from band to band, so that the proper circuit elements are brought into circuit connections in each case. In the disclosures of that earlier applications the stators of the variable impedances are of the single loop or U-shaped type, and due to this circumstance, among others, the tuning through each range or band is effected by approximately 180 degrees of rotor rotation. Furthermore, in that case all of the stators are located in alignment along one half or side of the shaft which carries the rotors of the variable impedances, and the rotors are located, some on one half or side of the unit, and some on the other half or side thereof, so that said rotors will come into proper electrostatic relations to their respective stators as needed from time to time and according to the circuit connections and bands being tuned.

It is a further feature and object of the present invention to provide arrangements such that various of the stator elements may be located at various and consecutive positions around the shaft which carries the rotors for such stator elements, thus making it possible to group the various stators in positions which will bring some of them into planar harmony, and with the further possibility that by so doing each of several or all of the rotors may be successively used to influence more than a single stator, and under proper conditions of timing and coordination with respect to the other stator elements. By this arrangement it will further be possible to reduce the axial length of the tuner as a whole, and also to reduce the number of rotors carried by the shaft, thus reducing the number of elements to be manufactured and assembled, with corresponding reduction of cost of manufacture.

Specifically, my improvements include the provision of stators of the "pancake" type, in which, however, I have provided loops or turns on both faces of the pancake, and have also provided rotors adjacent to both faces of such double pancake stator so as to influence all of the turns or loops on both of such faces. Still more specifically, and in one form or embodiment of my invention, I have provided conductors of spiral form of both faces of a common sheet of suitable insulating material, such as Bakelite. One of these spirals has its end or terminal at the outer periphery of the element, and it spirals inwardly in one direction (for example, by clockwise rotation) to the center of the spiral; and the spiral on the opposite face spirals from the center of the element, outwardly to the periphery (also in clockwise direction, for example), when viewed from the same side of the element as when looking at the first mentioned spiral; and a connection is made through the center of the spirals to join together both of their inner ends. With this arrangement both of the spirals are brought into series connection with each other, and with all turns of both spirals turning in the same direction for current passing through the entire unit, so that the inductive effects of all of the turns are cumulative. Furthermore, since both spirals are brought into close proximity, being separated only by a thin sheet of insulating material, it is evident that the inductive effect of the entire unit is much greater than the inductive effect of the two spirals additively considered, since cross inductive effects are also produced between the turns of the two spirals and through the thin sheet between them.

By the foregoing arrangement it is possible to produce very small variable impedance units which will have high impedance effects when embraced by their corresponding rotor elements, and it is possible to secure in single units of this type impedance effects as great as or much greater than the impedance effects possible to secure with numerous of the heretofore used U-shaped stator element type, as shown, for example in said earlier filed application.

I also contemplate the provision and use of such double faced pancake type stator elements, wherein the conductors carried by the two faces are of the U-shape, there being provided one such U-shape conductor on each face of the thin insulating sheet, and a proper cross-connection being effected between one outer end of each such U-shaped conductor with the outer end of the other such U-shaped conductor so as to bring both such conductors into series relationship. When using the U-shape conductor species of my present invention, it will be apparent that a double impedance value may be secured in each impedance element as compared to previous U-shaped elements of the simple form.

A further feature of my present invention relates to the manner of process whereby the stator elements incorporating features of my present invention are produced. In the production of stators of the double or two faced U-shaped type above referred to, I contemplate forming such stators as follows:

A thin sheet of conducting metal, such as sheet copper, is cemented to the face of each side of a thin sheet of suitable insulating material such as Bakelite. Then this entire three sheet or laminated element is cut out by a die cutting operation to the desired U-shaped form, thus producing a double U-shaped conductor with a thin sheet of insulating material between the two conductors, both of such conductors being of identical form and in exact registry with each other. Thereafter the outer ends of legs of the two conductors may be joined together by very short connections so as to bring both of the conductors into series connection, and as a completed unit.

In the case of the spiral shaped conductor stators herein contemplated, these may be readily formed as follows:

To the opposite faces of a thin sheet of suitable insulating material there may be joined by cementing or heat treatment thin sheets of conducting material such as sheet copper. Thereafter these metal sheets may be photographically treated to produce thereon the desired spirals by a photographic process; and thereafter the sheets may be treated to an etching process to etch away the metal not affected photographically, leaving on the sheet of insulating material only the spiral of conducting metal, one on each face of the insulating sheet. Thereafter, a very short connection may be established between the inner ends of the two spirals at the eye of the spirals, and suitable terminal elements may be provided at one edge of the insulating sheet connecting to the free ends of the two spirals.

The foregoing methods or processes are stated by way of illustration, and not as a limitation of the features of my present invention, except as I may limit myself hereinafter.

Other objects and uses of the invention will appear from a detailed description of the same, which consists in the features of construction and combinations of parts hereinafter described and claimed.

Figure 1:
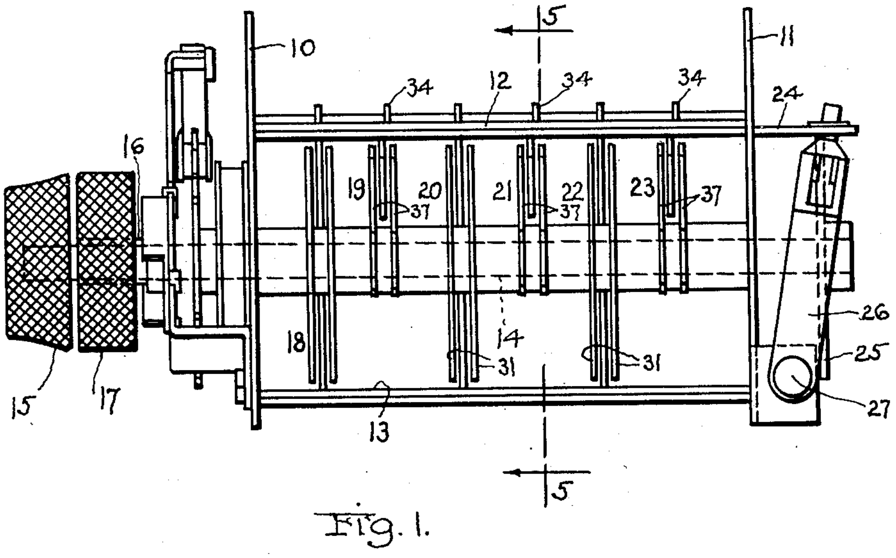
Figure 1 shows a side elevation of a typical tuner unit embodying the features of the present invention.
Figures 4, 5, 6, 7, 8:
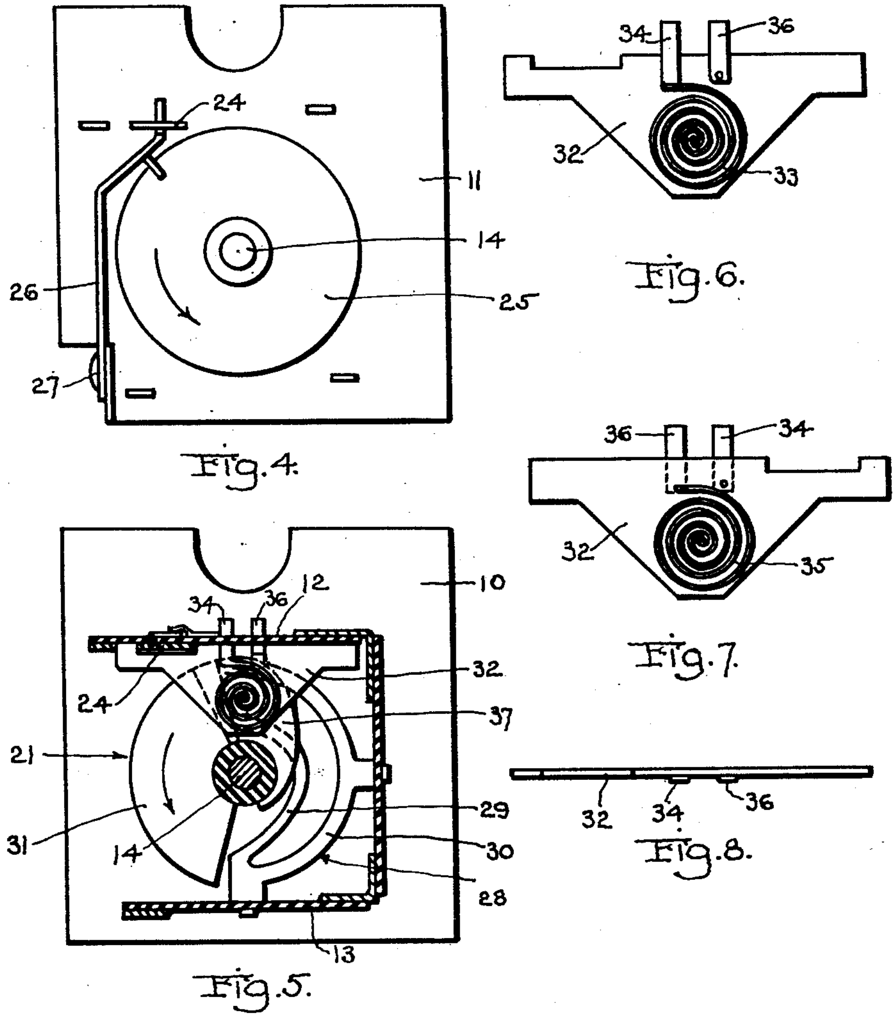
Figure 4 shows a cross-section taken on the line 4—4 of Figure 1, looking in the direction of the arrows, being in effect a right-hand end view.
Figure 9:
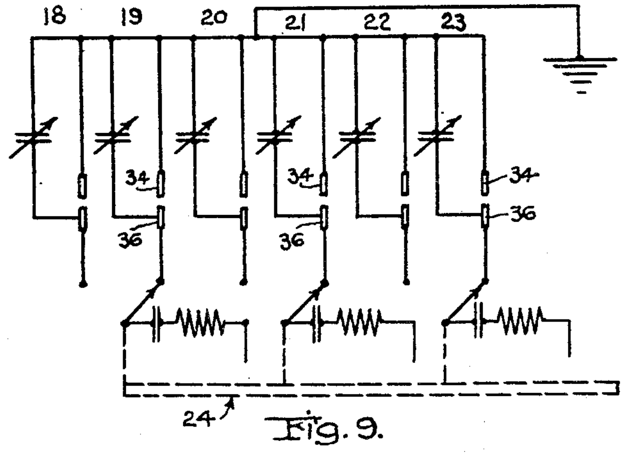
Figures 10, 11, 12, 13, 14:
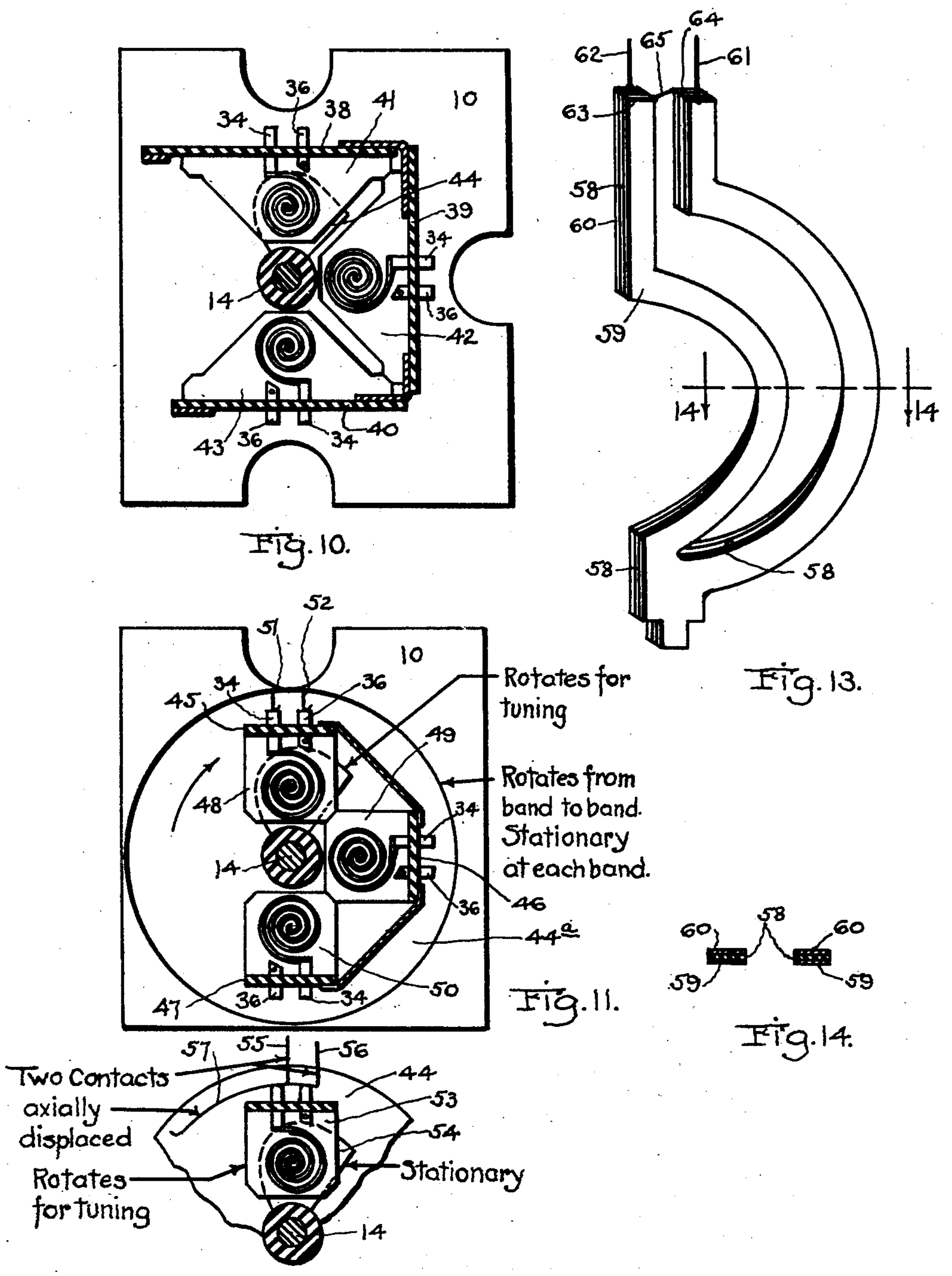

Figure 5 shows a cross-section taken on the line 5—5 of Figure 1, looking in the direction of the arrows; and this figure shows a stator element embodying the features of the present invention in near elevation, together with a corresponding rotor element, and it shows a stator element of the form disclosed in said earlier application, Serial No. 110,722, and the corresponding rotor element, in far elevation;

Figure 6 shows a detail right-hand face view of one of the stator elements embodying the present invention, but on enlarged scale as compared to Figures 1 to 5, inclusive;

Figure 7 shows a detail left-hand face view of the stator element shown in Figure 6, also on enlarged scale as compared to Figures 1 to 5, inclusive; and by comparison of Figures 6 and 7 it will be seen that both spirals, formed on the opposite faces of the stator plate, are so formed that they spiral continuously in the same direction, commencing at one terminal at the outer end of the spiral on one face, spiralling inwardly to the center, then passing through the plate to the inner end of the spiral on that face, and then spiralling outwardly on that opposite face of the plate to the other terminal at the outer edge of the plate;

Figure 8 shows a top edge view of the stator element shown in Figures 6 and 7;

Figure 9 shows a simple wiring diagram of a typical tuner embodying the features of the present invenion, including the form of stator shown in Figures 6, 7 and 8;

Figure 10 shows more or less schematically a cross-section through a modified form of tuner assembly incorporating the spiral conductor form of stators for all tuning band positions and for all variable impedance elements, instead of using such form of stators for only certain of the variable impedances; and in the arrangement of Figure 10 there are provided three stators in planar alignment with each other for each variable impedance position (as needed), such three stators lying in a common plane normal to the shaft axis; and there are provided such numbers of such spiral conductor stators in axial alignment with each other as may be necessary at each such normal plane; and there are provided one rotor for each set of three stators (or two rotors for the two faces of such stators as needed), each rotor (or two rotors) moving through its arc of influence on one stator by shaft rotation of ninety degrees, then moving through its arc of influence on the next stator by shaft rotation of the next ninety degrees, and finally moving through its arc of influence on the third stator by shaft rotation of the next ninety degrees, so that the three sets of stators are successively influence by one and the same group of rotors by successive ninety degree shaft rotations; these three successive ninety degree shaft movements corresponding to three successive bands of frequencies to be tuned; and suitable switching arrangements being provided corresponding generally to the switching arrangements provided for successive bands in the arrangement shown in Figures 1, 2, 3, 4, 5 and 9;

Figure 11 shows another modified arrangement of a tuner, also in cross-section and more or less schematically, in which there are provided three groups of stators of the type herein disclosed, each group including a number of stators to meet the circuit requirements of one band to be tuned, and all such stators being in axial alignment with each other, and all said stators being carried by a frame which may be rotated to carry the groups of stators into three successive angular positions with respect to the frame of the tuner; there being provided a rotational rotor element (or two such elements) for each stator element, so that as the frame is rotated the successive groups of stators are brought successively into position adjacent to their respective rotor elements; and there being provided a set of stationary contacts which will properly engage with the terminals of the set of stators thus brought into operating position so as to establish proper circuit connections of the stators of the group being then used, with other circuit elements of the tuning system; there being also provided a rotor (or two rotors) for each stator position and which will be located in proper embracing position with respect to the stators when any selected set of stators is rotated into working position; such rotors being carried by a shaft by which they may be rotated through a sufficient angle to ensure correct tuning of the set of stators then in position;

Figure 12 shows a fragmentary view similar to that of Figure 11, but in the case of Figure 12 the rotors are retained stationary at all times, and the frame carrying the stators is capable of rocking movement sufficient to move the stators through the necessary tuning rotation, the contacts of the terminals of each stator being so arranged that proper engagement with the stationary contacts for the other circuit elements will be ensured for such angular movement of the stators during tuning rotations;

Figure 13 shows a perspective view of a double-faced stator of the U-shaped type, comprising a thin sheet of suitable insulating material with a thin sheet of conductor applied to each face of such insulating sheet, and the three layer lamination being die cut to produce the desired U-shaped conductor stator element; and Figure 14 shows a cross-section taken on the line 14—14 of Figure 13, looking in the direction of the arrows.

In the drawings I have chosen to illustrate my present improvements as incorporated in a tuner of the general type disclosed in said earlier application, Serial No. 110,722, but in so doing I do not intend to limit myself except as I may do so in the claims to follow. The tuner illustrated in Figures 1 to 6, inclusive, includes the framework having the end walls 10 and 11, and the top 12 and bottom 13 which are securely connected to said end walls. These top and bottom plates 12 and 13 are conveniently made of suitable insulating material such as sheet plastic, and certain of the tuning elements are carried thereby. This tuner also includes the horizontally extending shaft 14 journalled in the end walls. This shaft may be rotated or rocked back and forth by suitable hand grips in well understod manner; and in the form illustrated I have provided the grip 15 which is directly connected to the shaft so that by use of this grip the shaft may be rapidly rotated to approximately the desired tuning position. I have also shown the sleeve or collar 16 journalled on the extending portion of the shaft 14 between the front end plate 10 and the grip 15; and the grip 17 is secured to this sleeve 16. Suitable means are provided intermediate between the sleeve 16 and the shaft 14, whereby the position of the shaft may be trimmed or accurately adjusted to exact tuning position after it has been roughly or approximately tuned by use of the grip 15. Thus, the tuner may be first brought to approximate tuning position by use of the grip 15, and then exact tuning may be effected by use of the grip 17. I have not herein disclosed this exact tuning means in the present application, as it does not comprise a portion of the present invention, but is fully disclosed in said earlier application, Serial No. 110,722.

The tuner shown in the drawings is provided with six impedance units which can be simultaneously varied by rotation of the shaft 14. These are shown at 18, 19, 20, 21, 22 and 23. Each includes a stator element and a rotor element, the latter being carried by and secured to the shaft. The stators of these variable impedances comprise portions of the tuner circuits, and for purposes of illustration such a tuner circuit is shown more or less schematically in Figure 9 wherein the several variable impedances are also shown. The details of this circuit need not be explained here as various forms of such circuits are well known, and one such form is also disclosed in said application, Serial No. 110,722.

It may be here stated, however, that in such circuits, especially when intended for tuning through two or more distinct bands of frequencies, as for example, a low television band and a high television band, together with a band of F. M. reception, some of the variable impedance units must be of much greater impedance quantity than others. Accordingly, in said earlier application, Serial No. 110,722, the impedances corresponding to the impedances 19, 21, and 23 of Figure 1 of the present application, are of multi-plate or multi-stator type, including two or more stator elements which are connected in series in order to obtain the desired impedance effect. Others of said variable impedances may be of such smaller impedance values that the needed impedance effects may be secured by use of a single stator of the form shown in that earlier application.

Figure 2:
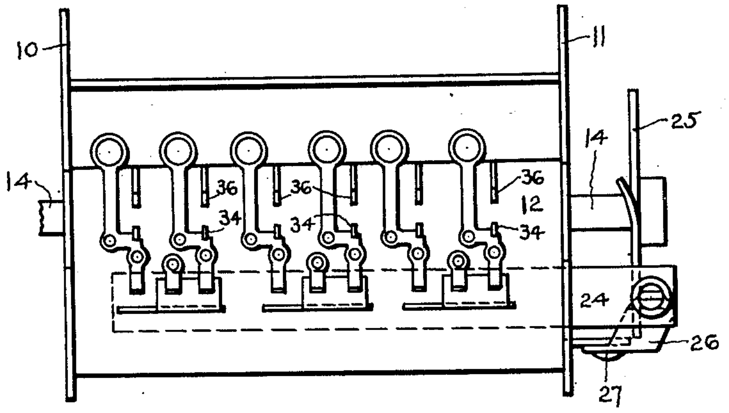
Figure 2 shows a plan view corresponding to Figure 1; part of the unit being broken away; and the switching element and contacts being in one position.
Figure 3:
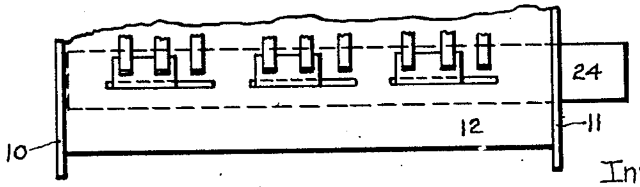
Figure 3 shows another view similar to that of Figure 2, but with more of the unit broken away; and in Figure 3 the switching element is moved to another switching position.

The tuner herein illustrated is also of such arrangement that it may be sequentially tuned by continuous shaft rotation through two or more bands of frequencies, corresponding, for example, to the low television band and the high television band. Certain of the variable impedances are used when tuning through the low band, and certain others are used when tuning through the high band. Accordingly, I have shown in Figures 2 and 3 a suitable switching arrangement for cutting the stators of the several variable impedances into and out of circuit as required when moving from one band to the other, or vice versa. This switching means includes a long plate 24 slidingly mounted on the top frame plate 12, and acting, in conjunction with the terminals of the several stators, and other elements, to cut the stators into and out of circuit as needed. In Figure 2 I have shown the switching elements as being in one switching position, and in Figure 3 said elements are shown as being in another switching position. An arrangement similar to that herein illustrated is shown in said earlier application, and for this reason I do not herein explain this switching means in full detail. However, it includes a cam shaped plate or element 25 carried by the shaft 14 at its back end, and engaging suitable ears of an arm 26 which is pivoted to a stationary point at 27, the upper end of this arm engaging with the rear end of the slide plate 24 so that said plate is shifted from one switching position to another with a quick movement when the shaft passes from positions to tune one band of frequencies to position for tuning the other band. Accordingly, the switching change is made without interfering with normal tuning at any of the intended tuning frequencies of either band.

In said earlier application each stator of the variable impedances comprises a U-shaped element 28 having the two curved generally vertical arms 29 and 30 which conveniently terminate at the top plate 12. The corresponding rotor is of generally semi-circular form, 31, so that as the rotor makes a semi-rotation the embracement between the rotor and the stator changes from a minimum to a maximum, with corresponding change of the impedance effect of the element. It will be understood that the rotor does not physically contact with the stator element, but that the impedance effect is electrostatically produced.

The improved variable impedance stator herein disclosed is shown in Figures 6, 7 and 8 in detail, and it is shown in one application to a tuner in Figures 1 and 5. This stator comprises a plate of suitable insulating material, such as synthetic sheet, 32. To one face of this sheet is applied a spiral conductor, 33, which, in the form shown (Figure 6), spirals inwardly in clockwise direction of winding. The outer end of this spiral is connected to the terminal 34. The inner end of this spiral passes through the sheet 32 and connects to the inner end of a spiral conductor 35 on the opposite face of the sheet 32. This spiral, in turn, spirals counterclockwise outwardly as shown in Figure 7, and its outer end is connected to another terminal, 36. By comparison of Figures 6 and 7 it will be seen that actually the inductive effects of the two spiral conductors on the two faces of the sheet 32 are cumulative, and that current flowing through both spirals in series travels rotatively in the same direction in both spirals.

The inductive effect which may be secured with a stator of given overall dimensions with this form of stator is much larger than that which can be secured with a stator of the same overall dimensions but of the form shown in said earlier application. Accordingly, by use of this improved form of stator for the variable impedances 19, 21 and 23, which require much greater inductance than the variable impedances 18, 20 and 22, it is possible to secure the needed inductances in all of the variable impedances without need of using more than a single stator for each variable impedance of the tuner unit.

Conveniently the stator plates 32 are mounted on the top plate 12 of the tuner and depend downwardly towards the shaft 14. Corresponding to each stator is a rotor element 37 carried by and secured to the shaft in position to rotate adjacent to but not in physical contact with the adjacent face of the stator element. Since each stator element is provided with the two spirals on its two faces there are provided two rotor elements corresponding to each stator. These rotor elements are so shaped that during a half rotation of the shaft each rotor progressively affects the adjacent stator spiral more and more, thus progressively increasing the inductance effect from a minimum to a maximum. One of these rotors is shown in Figure 5 at 37, and in that figure the rotor is shown as being completely moved to its maximum effect position. Rotation of the shaft in counterclockwise direction is indicated by the arrow in Figure 5. The form of the rotor is one presenting a maximum radius commencing at one extreme position, and with a progressively reduced radius until at the 180 degree position the radius is so reduced that substantially no portion of the rotor face will stand opposite to the stator conductor, the rotor having been rotated through 180 degrees of rotation from its initial position. Both rotors of the variable impedance element are so located on the shaft that both of the conductors are equally influenced at each rotor position.

It will be seen that in the embodiment of tuner shown in the figures each of the U-shaped stators is located to one side of the vertical plane passing through the shaft, whereas each of the improved forms of stator is located directly above the shaft. The rotor elements are correspondingly located on the shaft in order that they will correctly influence the several stators during rotor rotation. This arrangement also so places the improved form of stators that their terminals are brought out in line with the terminals of the U-shaped stators, which fact is apparent from examination of Figures 2 and 5. This arrangement also results in bringing out the terminals of all stators at positions close to points of attachment of other elements of the tuner circuit, which fact will be better understood from examination of said earlier application, Serial No. 110,722.

In the tuner arrangement shown schematically in Figure 10 the stationary frame including the insulating plates 38, 39 and 40 is similar to that shown in Figures 1, 2, 3, 4 and 5. In the present case, however, there are provided three sets of the double pancake type stators, shown at 41, 42 and 43, each set including such number of stators as may be needed to meet circuit requirements for tuning through one range or band or frequencies. In the showing of this figure each of these stators is provided with terminals, 34 and 36 which are permanently connected into the circuit to be tuned. The details of such connections need not be here given as manifestly they will depend on the various circuit arrangements selected and according to the tuning circuits themselves.

The shaft 14 in this case carries one rotor (or two, one for each face of the stator being tuned), 44, for each set of rotors considered around the arc of a circle, that is, there is one rotor (or two) for each group of stators, 41, 42 and 43. Each such rotor is so formed that during rotation of the shaft 14 such rotor passes progressively from a condition of full embracement as shown in Figure 10, with one stator, gradually to a condition of non-embracement with such stator, and during this process such rotor correspondingly increases its embracement with the next stator in planar alignment with the stator thus non-engaged. By the time that such rotor leaves its position of influence on the stator thus disengaged, it has come to position of full engagement or influence with the next stator of the series, shown at 42; and at about this time the switching means functions to bring the stator 42 (or set of such stators), into circuit and removes the stator 41 (or set of such stators) from circuit. Then, as rotation of the shaft 14 continues the embracement of the rotor with the stator (or set of stators) 42 gradually decreases with corresponding tuning function, until the stator 42 has been fully disengaged. At the same time the rotor is engaging or embracing the stator 43 (or set of such stators), so that when embracement of the stator 42 has been discontinued complete embracement of the stator 43 has been effected. At about this time the switching means again functions, to bring the stator 43 (or set of stators) into the tuning circuit, and as rotation of the shaft continues the function of disengagement from the stator 43 (or set of stators) continues to the completely disengaged condition.

It will thus be seen that with the arrangement of Figure 10 there is complete tuning through each band of frequencies during shaft rotation of 90 degrees, and that the several sets of stators are successively brought into play, and that tuning is progressive through each such set of stators.

The arrangement of Figure 10 presents the disadvantage that it is necessary to provide a set of circuit elements and connections for each band to be tuned.

In the arrangement shown in Figure 11 there is provided within the frame of the tuner a cradle or supplemental frame including the end walls 44ᵃ (only one of which is shown), and between these end walls there extend the plates of insulating material 45, 46 and 47. Each of these plates carries a set of stators needed for tuning through one band or range of frequencies, these stators being designated as 48, 49 and 50, respectively. The terminals 34 and 36 of each stator extend through the plate 45, 46 or 47 as the case may be, far enough for engagement by corresponding stationary contacts 51 and 52 in proper planar alignment with such terminals so that when any set of stators, 48, 49 or 50 is brought rotatively to proper position for tuning a selected band the terminals 34 and 36 of each of the stators of the set so brought into position will engage with corresponding contacts 51 and 52 for establishment of the tuning circuits, including the stators so brought into engagement with such stationary contacts 51 and 52. It will be understood that when tuning each band or range of frequencies the proper set of stators, 48, 49 or 50, will be thus brought into engagement with the contacts 51 and 52 for each of the stators of such set, so that the desired circuits are thus established between the stators so brought into play and the other circuit elements; and at the same time the switching means will also ensure completion of any circuit changes needed to ensure establishment of the correct circuit arrangements, including the so-selected stators.

The shaft 14 carries a rotor (or two such rotors) for each stator planar position, so that whenever a set of the stators has been brought to operating position, with its terminals engaged with the contacts 51 and 52, the rotation of the shaft will move the rotors to tune by changing the amount of embracement of the rotors with their respective stators. In this case, however, complete tuning is effected by rotor rotation through 90 degrees, and it is not necessary for the shaft to be moved to a succeeding arcuate position, as a new set of stators is brought into working position when one band or range of frequencies has been completed.

In the arrangement shown in partial detail in Figure 12 provision is made for rocking the cradle which includes the end walls 44, so that the stators, 53 will be rocked with respect to corresponding rotors, 54, which may thus be retained stationary, the tuning being effected by rocking the stators. In order to effect proper connection between the stator terminals 34 and 36, and the circuit contacts external to the cradle, said circuit contacts, 55 and 56 are located in different planar locations (along the axis of the tuner), and likewise the terminals 34 and 36 of the stator are located in such planar displacement, and each of the contacts 55 and 56 is extended in arcuate form, as well shown by the contact extension 57 in Figure 12, so that during rotation of the cradle through substantially ninety degrees of movement there will be retained proper circuit engagements between the stators carried by the cradle and the contacts leading to the other circuit elements.

It will be understood that with the arrangement of Figure 12 the cradle is subjected to two movements; when tuning through a selected range or band of frequencies the cradle is rocked back and forth within a range of substantially ninety degrees; when another range or band is to be tuned the cradle is rocked to a position substantially ninety degrees further on (or a multiple of ninety degrees) to thus bring into position another set of stators. Then the cradle is rocked within this new ninety degree segment of movements to tune within such newly selected range or band of frequencies, etc.

Referring to Figures 13 and 14 I have therein shown a double faced or two turn embodiment of stator of the U-shaped type, as a modification of the features of my present invention. In this case such stator comprises a U-shaped sheet or section of suitable insulating material, 58 of the same shape as each of the conductors which face such insulating sheet or spacer. These conductors are shown at 59 and 60, and each of them is of the same U-shaped form as the single turn stator elements shown in the aforesaid earlier filed application, Serial No. 110,722, and also in various of the figures of the present application. The conductor or turn 59 is provided with a terminal 61 on one leg, and the conductor or turn 60 is provided with a terminal 62 on its leg opposite to that of the terminal 61. The free ends 63 and 64 of the two turns or conductors are cross-connected by the short lead 65. Study of this double faced form of stator will at once show that it comprises two turns in series relationship between the terminals 61 and 62. Suitable rotors are provided adjacent to but slightly separated from the two faces or conductors of this double faced stator, so that rotation of these rotors will simultaneously blank off equal portions of the two stator conductrs. Thus this unit is of double and more than double the impedance effect of a single turn of the same shape and size, since there is cross-inductance between the two branches of the unit which are close together and separated only by the thickness of the thin insulating sheet 58.

Double turn elements of the form shown in Figures 13 and 14 may readily be formed by the following process:

A thin sheet of the selected insulating material, such as Bakelite, is surfaced with thin layers of conducting material, such as thin sheet copper on both faces. These conducting sheets may be readily adhered strongly to the faces of the insulating sheet as by means of cement or solvent, and with application of heat, in well understood manners. Thus there is first produced a three ply sheet comprising a thin sheet of the insulating material and the two outside thin sheets of conducting material, such as copper. This three ply sheet may then be readily die cut to produce the desired shape and size of element. The necessary terminals 61 and 62 may then be attached and the cross-connection 65 may be effected in simple manner.

It will be understood that in Figures 13 and 14 the size of the element has been exaggerated, and especially in these figures the thicknesses have been greatly exaggerated. The thicknesses of the intermediate insulating sheet 58, and of the conducting outerlayers 59 and 60 will, in fact be very small, say of the order of stiff paper or even less.

It will be seen that I contemplate as being within the scope of my invention stator elements comprising double faced elements each comprising a thin sheet of suitable insulating material having on its opposing faces turns of suitable conducting material, with a cross connection between proper portions of the turns and extending through the material of the insulating sheet or around such sheet, and so made that both of the turns, or the turns on both faces of the sheet are placed in series connection in such direction that electrostatic influences produced on adjacent rotor elements will influence such turns cumulatively to thereby affect the impedance of the double faced turns with production of corresponding increase of the impedance effect of the unit.

I also contemplate as within the scope of my invention tuners in which electrostatic type variable impedances are provided, and wherein there are provided two or more sets of such variable impedances influenced successively or at different times by one and the same set of rotors, either by movement of the stators with respect to the rotors, or by movement of the rotors with respect to the stators.

I also contemplate as within the scope of my invention various other features which have been herein disclosed, and which will be more particularly defined in the claims.

I claim:

1. As a new article of manufacture, an inductor element for an electrostatic tuning unit, said inductor element comprising a thin sheet of electrostatic insulating material, a spiral shaped thin conductor on one face of said sheet and comprising a continuous length of conductor lying continuously in contact with such face of the sheet and spiralling from the center of the spiral outwardly towards the periphery of the sheet, a second spiral shaped thin conductor on the opposite face of the same sheet and comprising a second continuous length of conductor lying continuously in contact with such opposite face of the sheet and spiralling from a center of such second spiral outwardly towards the periphery of the sheet, the centers of the spirals on the two faces of the sheet being opposite to each other, and the two spirals being so formed on the opposite faces of the sheet that the direction of rotation from the periphery of the sheet when following one spiral inwardly from such sheet periphery to the center of such spiral and viewed looking towards the face of the sheet against which said spiral is in contact, is the same as the direction of rotation from the center of the second spiral when following said second spiral outwardly from such center to the periphery of the sheet and looking in the same direction as aforesaid, together with an electrical connection through the sheet between and connected to the centers of the two spirals, and electrical connections to the peripheral ends of both of the spirals.

2. An electrostatic induction tuning element, comprising a stator element as defined in claim 1, together with a conducting sheet movably mounted for movement in a plane parallel to the plane of the sheet of such stator element closely adjacent to the proximate spiral conductor and separated therefrom by a thin airspace.

3. Means as defined in claim 2, wherein there is a conducting sheet mounted for movement at each side of the stator element in a plane parallel to the plane of the sheet of such stator element closely adjacent to the proximate spiral conductor and separated therefrom by a thin airspace.

CHESTER W. LYTLE.

References Cited in the file of this patent

UNITED STATES PATENTS

| Number | Name | Date |
|---|---|---|
| 2,330,824 | Granfield | Oct. 5, 1943 |
| 2,441,960 | Eisler | May 25, 1948 |
| 2,467,868 | Somerville | Apr. 19, 1949 |
| 2,468,126 | Silver | Apr. 26, 1949 |
| 2,511,608 | Wannamaker | June 13, 1950 |
| 2,532,263 | Silvey | Nov. 28, 1950 |
| 2,535,686 | Lawrence | Dec. 26, 1950 |
| 2,587,419 | Washburn | Feb. 26, 1952 |

FOREIGN PATENTS

| Number | Country | Date |
|---|---|---|
| 217,918 | Great Britain | Aug. 21, 1924 |